United States Patent [19]
McCrary

[11] Patent Number: 5,978,210
[45] Date of Patent: Nov. 2, 1999

[54] TWO-PIECE FLEX CIRCUIT BOBBIN FOR PORTABLE COMPUTERS

[75] Inventor: Rolla P. McCrary, Austin, Tex.

[73] Assignee: Dell Computer Corporation, Round Rock, Tex.

[21] Appl. No.: 08/942,258

[22] Filed: Oct. 1, 1997

[51] Int. Cl.[6] ............................... G06F 1/16; H05K 5/00
[52] U.S. Cl. ............................................. 361/680; 174/89
[58] Field of Search ..................................... 361/680, 681;
49/167; 174/89, DIG. 9; 439/31, 164, 165;
242/407, 601, 613.2

[56] References Cited

U.S. PATENT DOCUMENTS

| | | | |
|---|---|---|---|
| 3,970,902 | 7/1976 | Brettman et al. | |
| 4,864,523 | 9/1989 | Sasaki | 364/708 |
| 5,141,446 | 8/1992 | Ozouf et al. | 439/165 |
| 5,278,725 | 1/1994 | Konno et al. | 361/680 |
| 5,335,142 | 8/1994 | Anderson | 361/681 |
| 5,390,075 | 2/1995 | English et al. | 361/683 |
| 5,394,297 | 2/1995 | Toedter | 361/683 |
| 5,574,252 | 11/1996 | Hill | 174/51 |

*Primary Examiner*—Lynn D. Feild
*Assistant Examiner*—Jagdish Patel
*Attorney, Agent, or Firm*—Haynes and Boone, L.L.P.

[57] ABSTRACT

A portable computer includes a base and a top pivotally mounted on the base by a hinged interconnection. A flex circuit is connected to an electrical device in the base and an electrical device in the top. A bobbin is mounted adjacent the hinged interconnection. The flex circuit is engaged with the bobbin and has a portion wrapped around the bobbin. The bobbin includes a core member and a removable cover member mounted on the core member. The cover member covers an exposed protruding edge of the flex circuit for limiting contact wear between the flex circuit and the exposed edge thereof.

15 Claims, 4 Drawing Sheets

5,978,210

TWO-PIECE FLEX CIRCUIT BOBBIN FOR PORTABLE COMPUTERS

BACKGROUND

The disclosures herein relate generally to portable computers and more particularly to a two-piece flex circuit bobbin for use therewith.

In portable computers, the LCD screen is provided on a hinged top which is rotatably mounted on a base. Electrical connections are required between the base and top. These electrical connections must transition through the hinged connection between the base and the top. To accomplish this, a flex circuit with multiple circuit traces is used.

One end of the flex circuit is connected to the motherboard in the base. The other end includes connections to the LCD screen, the inverter board for the back light, and several LED displays which indicate the operational status of the computer including, for example, power on, whether the power is AC or battery-power, whether the battery is low, and whether the hard drive or a floppy drive are in use. Physically, the flex circuit comprises a circuit trace layer and a copper clad substrate EMI shielding layer disposed on either side of the circuit layer. The thickness of these layers is about 0.030 inches.

The flex circuit is adhered to and wrapped around a bobbin located adjacent the area of the hinged connector. The bobbin is a tubular device, circular in cross-section. A protruding terminal edge of the flex circuit is adhered to an outer arcuate surface of the bobbin. The flex circuit is wrapped around the bobbin sufficiently to overlappingly engage the edge prior to installation of the bobbin adjacent the hinged connector. Repeated opening and closing of the hinged top wraps and unwraps the flex circuit around the bobbin. This motion exposes the overlapping portion of the flex circuit into repeated engagement with the edge, which eventually wears and works the flex circuit until one or more of the circuit traces fracture or fail.

Therefore, what is needed is a flex circuit and bobbin combination which can be repeatedly wrapped and unwrapped due to opening and closing the top of the portable computer in a manner which reduces wear and improves the life and reliability of the flex circuit.

SUMMARY

One embodiment, accordingly, includes an apparatus for providing improved wear characteristics for bobbin mounted flex circuits. To this end, a bobbin is provided for use in a portable computer system. The bobbin comprises a core member which is an elongated tubular member having an oblong cross-section. An elongated cover member is removably mounted on the core member. The cover member has an arcuate cross-section and a pair of tapered edges which engage the core member.

A principal advantage of this embodiment is that the protruding edge of the flex circuit is adhered to the core member and the cover member is mounted on the core member covering the protruding edge. The flex circuit is then wrapped over the cover member and contact between the flex circuit and protruding edge is avoided.

DETAILED DESCRIPTION OF THE PREFERRED EMBODIMENT

Figure 1:
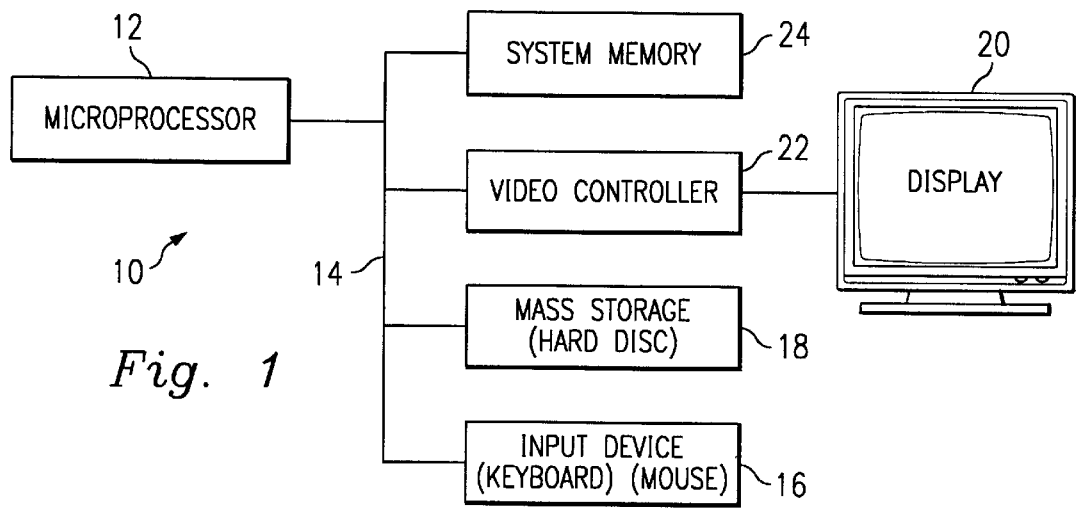
FIG. 1 is a diagrammatic view illustrating an embodiment of a typical computer system.

In one embodiment, computer system 10, FIG. 1, includes a microprocessor 12, which is connected to a bus 14. Bus 14 serves as a connection between microprocessor 12 and other components of computer system 10. An input device 16 is coupled to microprocessor 12 to provide input to microprocessor 12. Examples of input devices include keyboards, touchscreens, and pointing devices such as mouses, trackballs and trackpads. Programs and data are stored on a mass storage device 18, which is coupled to microprocessor 12. Mass storage devices include such devices as hard disks, optical disks, magneto-optical drives, floppy drives and the like. Computer system 10 further includes a display 20, which is coupled to microprocessor 12 by a video controller 22. A system memory 24 is coupled to microprocessor 12 to provide the microprocessor with fast storage to facilitate execution of computer programs by microprocessor 12. It should be understood that other busses and intermediate circuits can be deployed between the components described above and microprocessor 12 to facilitate interconnection between the components and the microprocessor.

Figure 2:
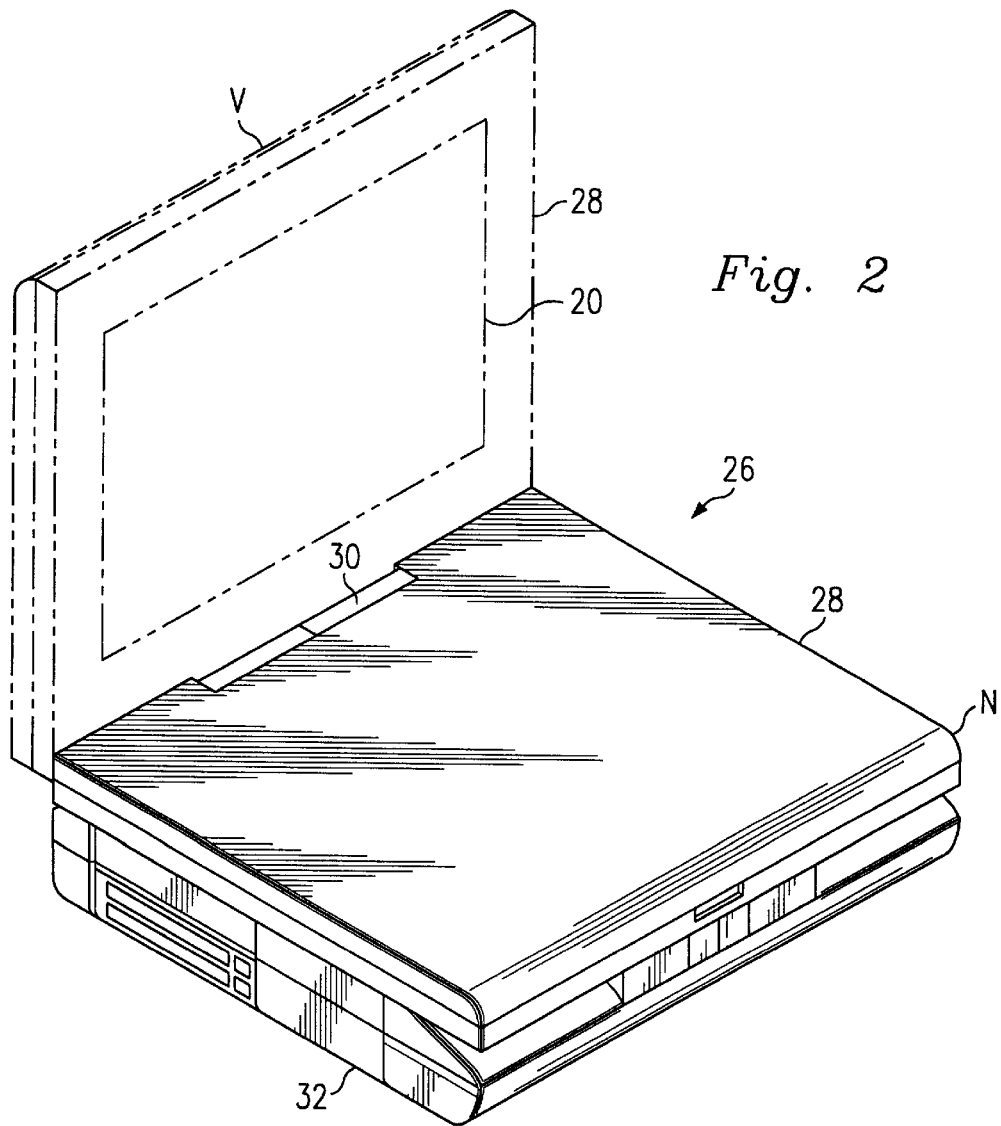
FIG. 2 is an isometric view illustrating an embodiment of a portable computer.

Referring to FIG. 2, illustrated is a well-known portable notebook size computer designated 26 including self-contained computer system 10, as described above and illustrated in FIG. 1. Again in FIG. 2, a hinged top 28 including display 20 is rotable about a hinged interconnection 30 from a nested position "N" with a horizontal base 32, to various exemplary open positions such as the position designated "V."

Figure 3:
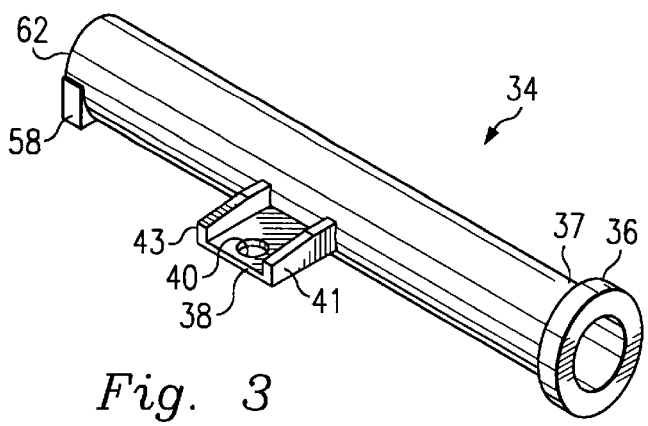
FIG. 3 is an isometric view illustrating an embodiment of a bobbin core.
Figure 4:
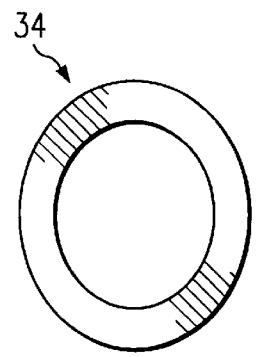
FIG. 4 is a cross-sectional view illustrating an embodiment of the bobbin core.
Figure 5:
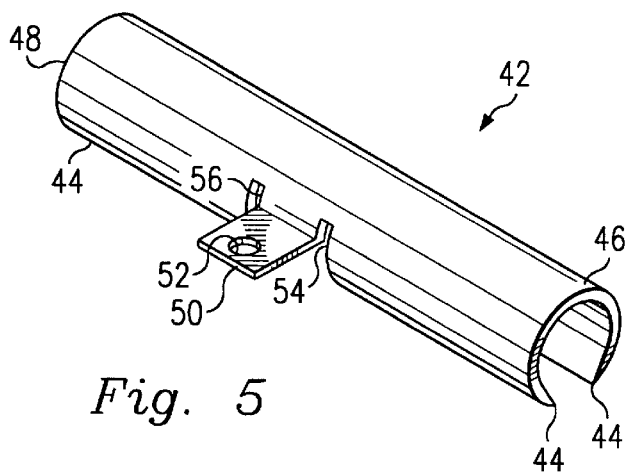
FIG. 5 is an isometric view illustrating an embodiment of a bobbin cover.
Figure 6:
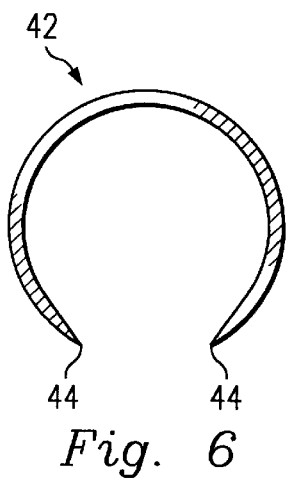
FIG. 6 is a cross-sectional view illustrating an embodiment of the bobbin cover.

A core member 34 of a bobbin used in system 10 is illustrated in FIG. 3. Core member 34 is an elongated tubular member having an oblong cross-section, FIG. 4. A raised guide surface 36, FIG. 3, is formed on an end 37 of core member 34. An extension 58 on another end 62 of core member 34 may also function as a guide surface. A mounting flange 38 extends radially or substantially radially outwardly from core member 34. Mounting flange 38 includes a mounting aperture 40 formed therein between a pair of spaced apart side rails 41, 43. A cover member 42 used with core member 34 in system 10 is illustrated in FIG. 5. Cover member 42 is an elongated member forming a portion of a tube being slightly greater than semi-circular and having an arcuate cross-section, FIG. 6. A pair of tapered edges 44 are opposed, as viewed in FIG. 6, and extend lengthwise along cover member 42, FIG. 5, between a first end 46 and a second end 48. A coupling flange 50 extends radially or substantially radially outwardly from cover member 42 and includes a coupling aperture 52 formed therein. A pair of spaced apart slots 54, 56 are formed in cover member 42 on opposite sides of flange 50.

Figure 7:
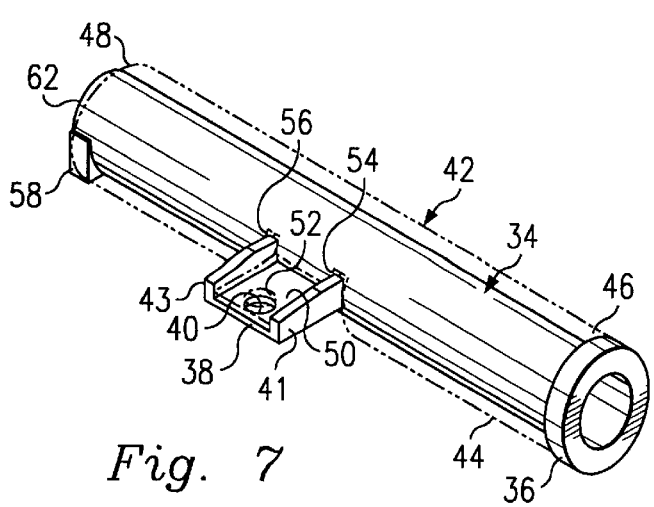
FIG. 7 is an isometric view illustrating an embodiment of the bobbin cover mounted on the bobbin core.
Figure 8:
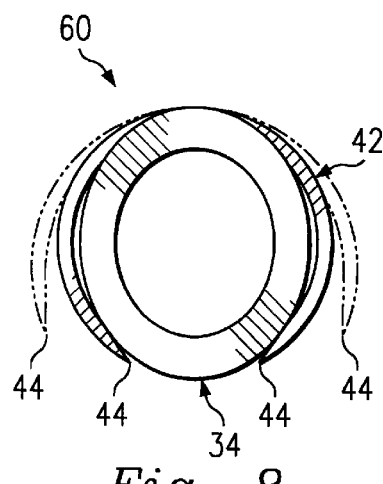
FIG. 8 is a cross-sectional view illustrating an embodiment of the bobbin cover mounted on the bobbin core.

Cover member 42 may be removably mounted on core member 34, FIG. 7, so that coupling flange 50 seats on mounting flange 38, and apertures 40, 52 are aligned. Slots 54, 56 receive side rails 41, 43, respectively. Tapered edges 44, only one of which is shown in FIG. 7, provide a lengthwise engagement of core member 34. In FIG. 8, it can be seen that when cover member 42 is mounted on core member 34, a unitary bobbin 60 is formed having a substantially circular cross-section. Tapered edges 44 engage core member 34 and form a smooth joint therewith. Cover member 42 is substantially flexible to permit edges 44 to separate or flex apart sufficiently and allow cover member 42 to be urged on and off core member 34 and to grip core member 34 so as not to inadvertently separate from core member 34.

Figure 9:
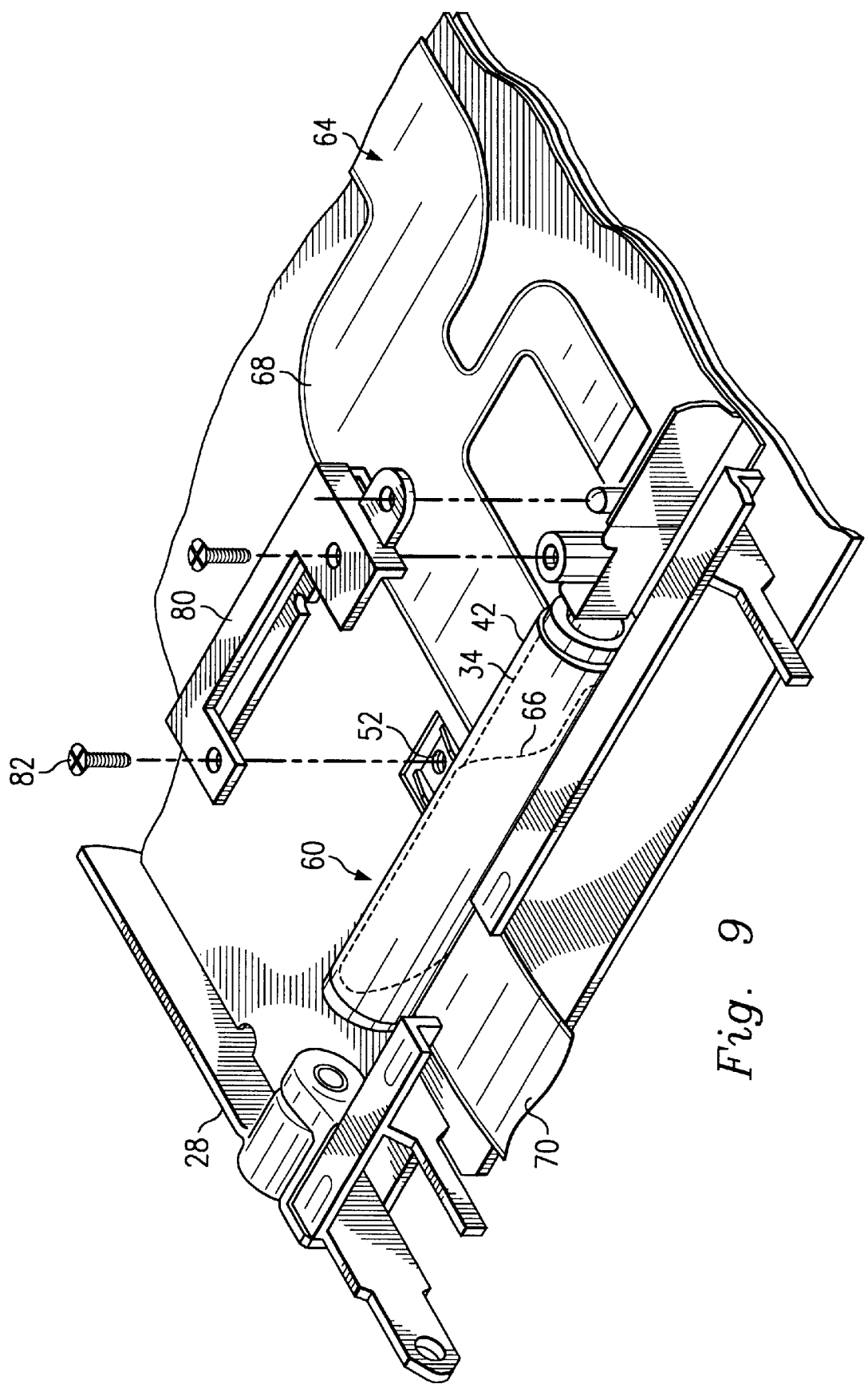
FIG. 9 is an isometric view illustrating an embodiment of the bobbin mounted in a portion of a portable computer.
Figure 10:
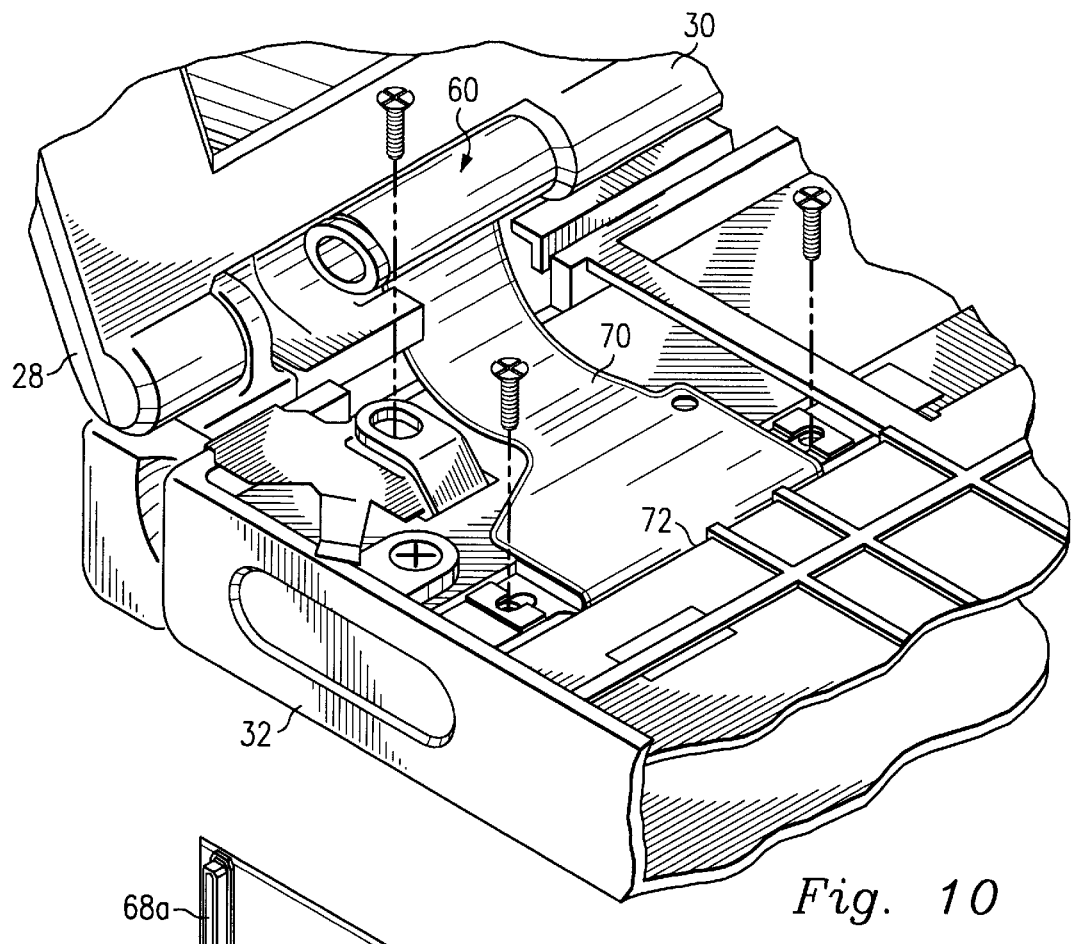
FIG. 10 is an isometric view illustrating an embodiment of the bobbin and a flex circuit mounted in a portable computer.

A flex circuit 64, FIG. 9, includes an exposed edge 66 engaged with bobbin core member 34 by means of an adhesive as is well known. Exposed edge 66 of flex circuit 64 protrudes radially from core member 34 due to the thickness of the flex circuit, e.g. about 0.030 inches. Cover member 42 is mounted on core member 34 for covering exposed edge 66 and limiting contact wear between flex circuit 64 and edge 66, i.e., as flex circuit 64 is partially wrapped and unwrapped around unitary bobbin 60, flex circuit 64 engages cover member 42 and is limited from contact with exposed edge 66. A first portion 68 of flex circuit 64 extends from unitary bobbin 60 and is electrically connected to well known devices in hinged top 28 such as an LCD, a backlight inverter board and LED displays (not shown). A second portion 70, FIGS. 9 and 10 of flex circuit 64 is electrically connected to electrical devices in base 32 such as motherboard 72. A clamp 80, FIG. 9, secures bobbin 60 adjacent the hinged interconnection 30 between top 28 and base 32, FIG. 10, and a fastener 82, FIG. 9, extends through the aligned apertures 40, 52 of the mounting flange 38 and coupling flange 50, respectively.

Figure 11:
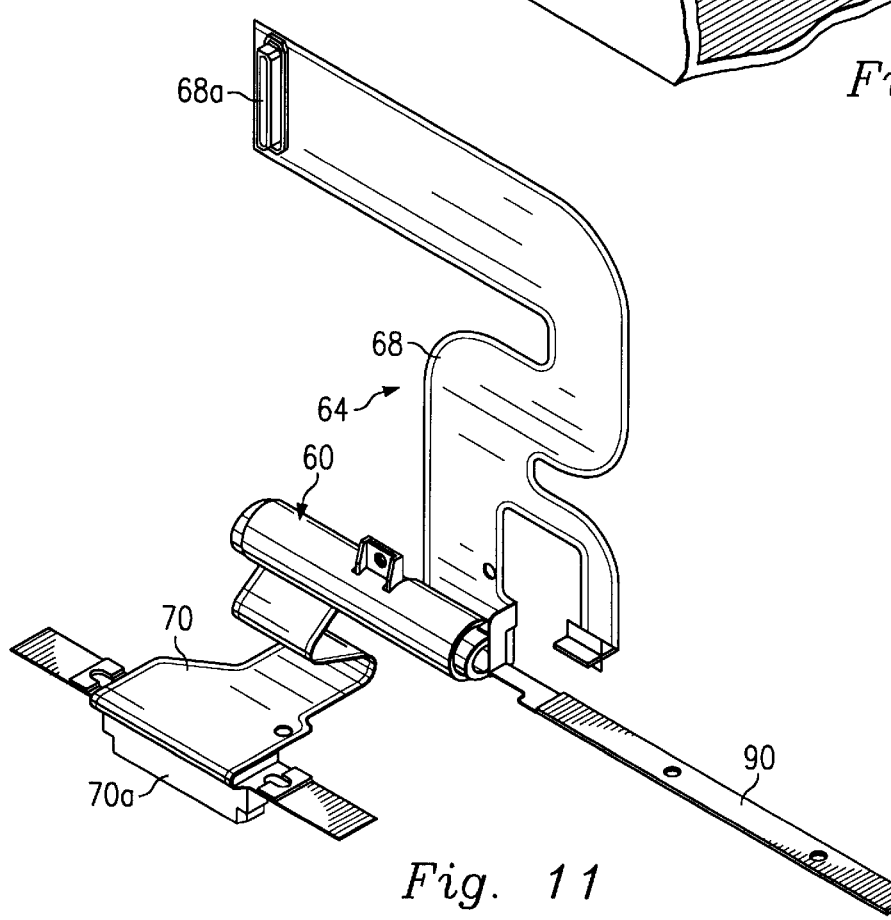
FIG. 11 is an isometric view illustrating an embodiment of the bobbin and the flex circuit.

In FIG. 11, unitary bobbin 60 is illustrated along with first portion 68 of the flex circuit 64 including a connector 68a, and second portion 70 of flex circuit 64 including a connector 70a. A third portion 90 of flex circuit 64 connects to an LED operating display panel (not shown).

In operation, the flex circuit 64 is attached to bobbin core member 34 and bobbin cover member 42 is attached to core member 34 so as to cover a protruding edge 66 of flex circuit 64. First and second portions 68, 70 of flex circuit 64 are then partially wrapped around cover member 42 and attached to electrical components in the top and base portions 28, 32 respectively of notebook computer 26. In this manner, flex circuit 64 is maintained out of repeated wear contact with edge 66 by cover member 42 as top 28 is rotated relative to base 32.

As it can be seen, the principal advantages of these embodiments are that the protruding edge of flex circuit is mounted on the bobbin core and concealed by the bobbin cover. The extended portions of the flex circuit are wrapped around the cover, and contact between the flex circuit and the protruding edge is avoided. Thus, repeated wrapping and unwrapping of the flex circuit around the bobbin cover, due to opening and closing of the top of the portable computer, reduces wear and improves the life and reliability of the flex circuit.

Although illustrative embodiments have been shown and described, a wide range of modifications, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A bobbin for use in a portable computer system comprising:

a core member, the core member being an elongated tubular member having an oblong cross-section; and a cover member, the cover member being an elongated member removably mounted on the core member and having an arcuate cross-section and a pair of tapered edges for lengthwise engagement of the core member.

2. The bobbin as defined in claim 1 wherein the core member includes a mounting flange extending radially therefrom, the mounting flange having a mounting aperture formed therein.

3. The bobbin as defined in claim 2 wherein the cover member includes a coupling flange for coupling engagement with the mounting flange, the coupling flange having an aperture formed therein for alignment with the mounting aperture formed in the mounting flange.

4. The bobbin as defined in claim 1 wherein the core member includes a raised guide surface formed on at least one end thereof.

5. The bobbin as defined in claim 1 wherein the core member and the cover member mounted thereon form a unitary bobbin having a substantially circular cross-section.

6. A computer system comprising:

a housing;

a microprocessor mounted in the housing;

an input coupled to provide input to the microprocessor;

a mass storage coupled to the microprocessor;

a display coupled to the microprocessor by a video controller;

a memory coupled to provide storage to facilitate execution of computer programs by the microprocessor;

the housing including a base and a top pivotally mounted on the base by a hinged interconnection; and a bobbin mounted adjacent the hinged interconnection, the bobbin including a core member and a removable cover member mounted thereon, the cover member covering a substantial outer surface portion of the core member, the core member including a mounting flange extending radially therefrom, the mounting flange having a mounting aperture formed therein, and the cover member including a coupling flange for coupling engagement with the mounting flange, the coupling flange having an aperture formed therein for alignment with the mounting aperture formed in the mounting flange.

7. The computer system as defined in claim 6 wherein the core member includes a raised guide surface formed on at least one end thereof.

8. A computer system comprising:

a housing;

a microprocessor mounted in the housing;

an input coupled to provide input to the microprocessor;

a mass storage coupled to the microprocessor;

a display coupled to the microprocessor by a video controller;

a memory coupled to provide storage to facilitate execution of computer programs by the microprocessor;

a housing including a base and a top pivotally mounted on the base by a hinged interconnection; and a bobbin mounted adjacent the hinged interconnection, the bobbin including a core member and a removable cover member mounted thereon, the cover member covering a substantial outer surface portion of the core member, the core member being an elongated tubular member having an oblong cross-section, and the cover member being an elongated member having an arcuate cross-section and a pair of tapered edges for lengthwise engagement of the core member.

9. The computer system as defined in claim 8 wherein the core member and the cover member mounted thereon form a unitary bobbin having a substantially circular cross-section.

10. A portable computer system comprising:

a base;

a top pivotally mounted on the base by a hinged interconnection;

a flex circuit having a first end connected to an electrical device in the base and a second end connected to an electrical device in the top;

a bobbin core member mounted adjacent the hinged interconnection, the flex circuit having a protruding edge engaged with the bobbin core;

a removable bobbin cover member mounted on the core covering the protruding edge of the flex circuit, the flex circuit being wrapped over the cover, whereby the cover limits contact wear between the flex circuit and the protruding edge thereof;

the core member including a mounting flange extending radially therefrom the mounting flange having a mounting aperture formed therein; and the core member including a coupling flange for coupling engagement with the mounting flange, the coupling flange having an aperture for alignment with the mounting aperture formed in the mounting flange.

11. The computer system as defined in claim 10 wherein the core member includes a raised guide surface formed on at least one end thereof.

12. A portable computer system comprising:

a base;

a top pivotally mounted on the base by a hinged interconnection;

a flex circuit having a first end connected to an electrical device in the base and a second end connected to an electrical device in the top;

a bobbin core member mounted adjacent the hinged interconnection, the flex circuit having a protruding edge engaged with the bobbin core; and a removable bobbin cover member mounted on the core covering the protruding edge of the flex circuit, the flex circuit being wrapped over the cover, whereby the cover limits contact wear between the flex circuit and the protruding edge thereof, the core member being an elongated tubular member having an oblong cross-section, and the cover member being an elongated member having an arcuate cross-section and a pair of tapered edges for lengthwise engagement of the core member.

13. The computer system as defined in claim 12 wherein the core member and the cover member mounted thereon form a unitary bobbin having a substantially circular cross-section.

14. The computer system as defined in claim 12 wherein the oblong cross-section of the core member and the arcuate cross-section of the cover member mounted thereon form a unitary bobbin having a substantially circular cross-section and the tapered edges of the cover member form a substantially smooth joint with the core member.

15. A method of improving wear in a flex circuit mounted on a bobbin in a computer system comprising the steps of:

attaching an edge portion of the flex circuit onto an elongated surface of a tubular bobbin core having an oblong cross-section;

mounting a removable elongated bobbin cover, having an arcuate cross-section and tapered edges, on the bobbin core to cover the edge portion of the flex circuit;

wrapping an extended portion of the flex circuit over the bobbin cover to avoid wear contact between the edge portion and the extended portion of the flex circuit;

mounting the bobbin core, bobbin cover the flex circuit adjacent a hinged interconnection between a top portion and a base portion of a portable computer;

electrically connecting one end of the flex circuit to an electrical component in the top; and electrically connecting another end of the flex circuit to an electrical component in the base.

\* \* \* \* \*

UNITED STATES PATENT AND TRADEMARK OFFICE
CERTIFICATE OF CORRECTION

PATENT NO. : 5,978,210
DATED : November 2, 1999
INVENTOR(S) : Rolla P. McCrary

It is certified that error appears in the above-identified patent and that said Letters Patent is hereby corrected as shown below:

<u>Column 5,</u>
Line 36, after "therefrom", insert -- , --.

Signed and Sealed this

Second Day of April, 2002

Attest:

Attesting Officer

JAMES E. ROGAN
*Director of the United States Patent and Trademark Office*